United States Patent
Sutardja

(10) Patent No.: US 6,898,655 B1
(45) Date of Patent: May 24, 2005

(54) MULTIPORT HIGH SPEED COMMUNICATIONS INTEGRATED CIRCUIT

(75) Inventor: Sehat Sutardja, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 503 days.

(21) Appl. No.: 09/987,824

(22) Filed: Nov. 16, 2001

(51) Int. Cl.$^7$ .................. G06F 13/00; H04L 12/28; H04J 3/16

(52) U.S. Cl. .............. 710/305; 710/313; 370/463; 370/910

(58) Field of Search ................. 710/305, 2, 63, 710/72, 100, 313; 370/402, 463, 910; 345/519; 712/32, 33; 711/147; 709/201; 361/683

(56) References Cited

U.S. PATENT DOCUMENTS

| | | | |
|---|---|---|---|
| 5,646,651 A | * | 7/1997 | Spannaus et al. ............ 345/519 |
| 5,809,337 A | * | 9/1998 | Hannah et al. ............... 710/33 |
| 5,970,069 A | * | 10/1999 | Kumar et al. ............... 370/402 |
| 6,320,711 B2 | * | 11/2001 | Hill ............................. 360/46 |
| 6,665,807 B1 | * | 12/2003 | Kondo et al. ............... 713/400 |

OTHER PUBLICATIONS

APT Technologies, Inc., "Serial ATA: High Speed Serialized AT Attachement", Revision 1.0, Aug. 29, 2001, pp. 1–7, 23–26.*

"A low cost, high speed portable communications device: a case study using IDT RV4640 microprocessor & IDT77903 ATM card" by Kakkar, S.; Hussain, A.B. (abstract only).*
"Flow control in a high–speed bus–based ATM switching hub" by Song Chong, Ramesh Nagarajan, Yung–Terng Wang (abstract only).*
Mini PCI FAQ.
PCI–X FAQ.
Serial ATA/High Speed Serialized AT Attachment, Serial ATA Workgroup, Revision 1.0.0.0 Nov. 15, 2000.
PCI–X Addendum to the PCI Local Bus Specification, Revision 1.0a, PCI Special Interest Group, Jul. 24, 2000.
PCI Local Bus, Errata and Clarifications to the PCI–X Addendum, Revision 1.0a, Update Mar. 12, 2001, Rev P.
PCI Local Bus, PCI Local Bus Specification, Revision 2.2. Dec. 16, 1998.
PCI Local Bus, PCI–X Addendum to the PCI Local Bus Specification, Review Draft, Revision 1.0, Jun. 17, 1999.
PCI Local Bus, PCI–X Addendum to the PCI Local Bus Specification Revision 1.0 Sep. 22, 1999.

* cited by examiner

*Primary Examiner*—Gopal C. Ray

(57) ABSTRACT

An integrated circuit for multi-port communications is provided. The integrated circuit includes a high speed bus interface to interface to a core chipset through a high speed bus. A serial mass data storage host adapter is in communication with the high speed bus interface to control a high speed mass data storage unit. A network controller is in communication with the high speed bus interface to control a network port.

39 Claims, 3 Drawing Sheets

MULTIPORT HIGH SPEED COMMUNICATIONS INTEGRATED CIRCUIT

TECHNICAL FIELD

This invention relates to integrated circuits, and more particularly to integrated circuits for interfacing to computer peripheral devices.

BACKGROUND

Performance increases in computers are generally related to the evolution of components and assemblies such as memory, hard drives, processors, and graphics accelerators. Somewhat lagging in evolution has been the bus that is employed for interconnecting the components and assemblies of computers. Recently, several new standards for next generation high speed buses have been proposed. In addition, a new standard (Serial ATA) for interconnecting computer systems to internal storage units has been proposed. These new standards offer the promise of further increases in performance, but also present a new set of problems in creating workable interconnect designs.

SUMMARY

An integrated circuit for multi-port communications is provided. The integrated circuit includes a high speed bus interface to interface to a core chipset through a high speed bus. A serial mass data storage host adapter is in communication with the high speed bus interface to control a high speed mass data storage unit. A network controller is in communication with the high speed bus interface to control a network port.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
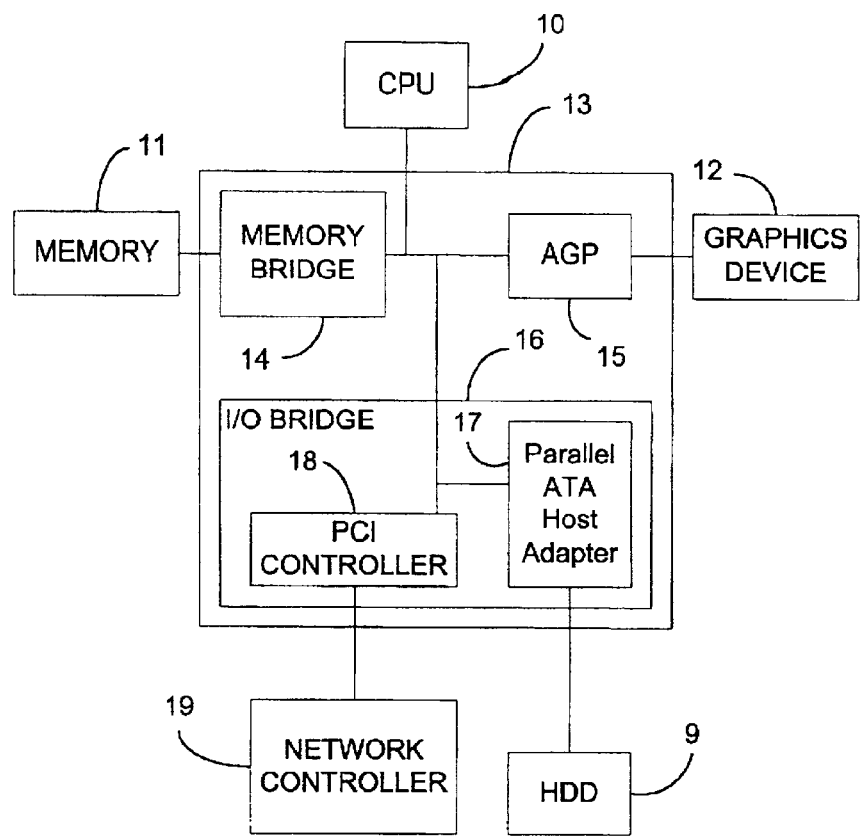
FIG. 1 is a block diagram of a conventional computer bus structure.

Shown in FIG. 1 is a block diagram of one conventional computer bus structure. The computer system core components comprising a processor 10, memory 11, and graphics device 12 may be connected to the peripheral components through a core chipset 13. The core chipset 13 typically includes a memory bridge 14 to control memory accesses, an accelerated graphics processor 15 to control graphics operations, and an I/O bridge 16 to control the flow of information over a local bus between the processor 10 and the peripheral devices. The I/O bridge 16 typically includes a parallel ATA host adapter 17 to connect a storage device 9 to the processor 10 over the local bus. A PCI controller 18 controls access to the local bus by I/O devices such as a network controller 19.

Figure 2:
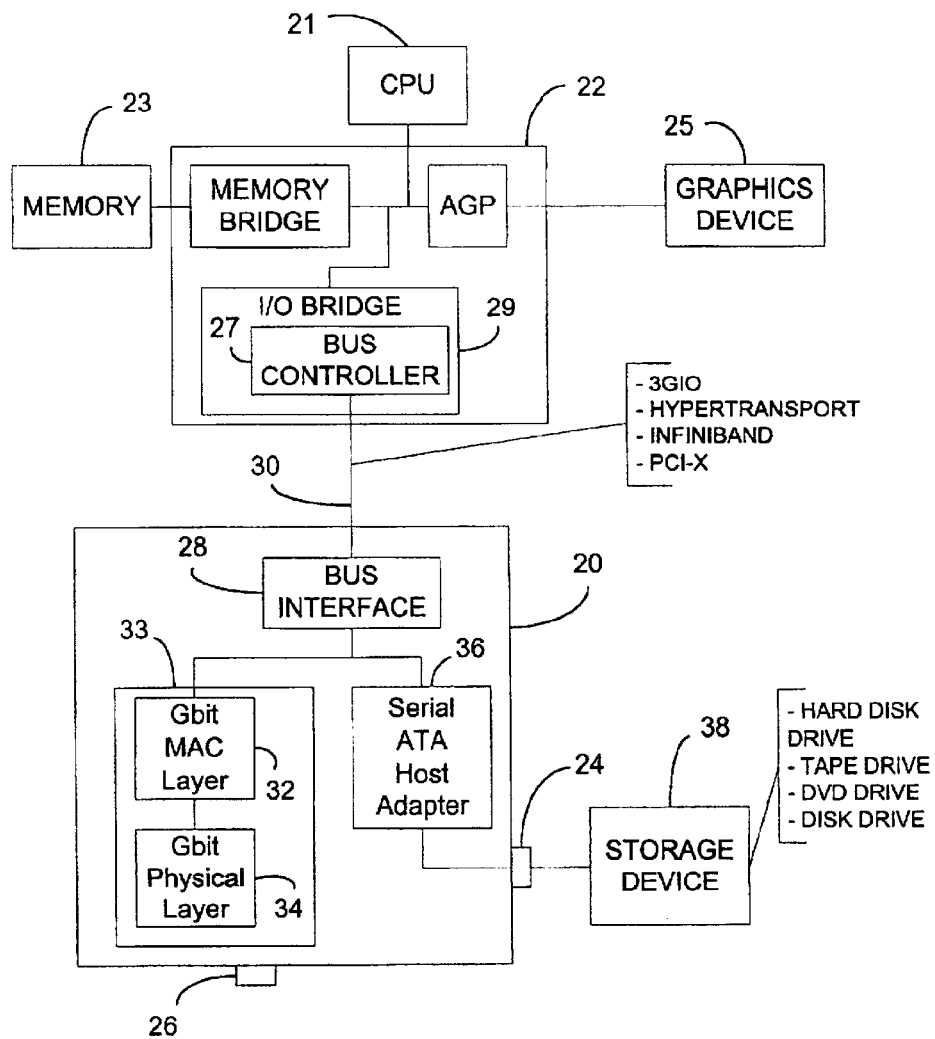
FIG. 2 is a block diagram of an embodiment of a multi-port communications chip coupled to a core chipset.

Shown in FIG. 2 is a block diagram of an embodiment of a multi-port communications chip 20 coupled to a core chipset 22. The multi-port communications chip 20 advantageously provides control for a serial ATA port 24 as well as a high speed Ethernet port 26 on a single integrated circuit that is outside of the core chipset 22. The integrated circuit is preferably formed on a single substrate using 0.18 um CMOS technology or smaller. However, the scope of the invention includes forming the integrated circuit in a multi-chip module.

The multi-port communications chip 20 may preferably be coupled between a high speed bus 30 and peripheral components including high speed network devices (not shown) and high speed storage devices 36. The high speed bus 30 couples input/output (I/O) devices to the computer system core components through the core chipset 22. The system core components may include a processor 21, memory 23, and graphics 25. The core chipset 22 may include a bus controller 27 within an I/O bridge 29 to control the flow of information between the high speed bus 30 and the system core components. The high speed bus 30 may comply with any high speed bus standard including HyperTransport™, PCI-X (Peripheral Component Interconnect-Extended), 3GIO (Third Generation Input/Output), and Infiniband™.

The multi-port communications chip 20 preferably includes a single bus interface 28 to interface to the high speed bus 30. However, another bus interface may be included to interface to the core chipset 22 through another high speed bus. The bus interface includes interfaces such as HyperTransport™ interfaces, PCI-X interfaces, 3GIO interfaces, and Infiniband™ interfaces.

A high speed Ethernet controller 33 preferably including a MAC (media access control) layer 32 and a physical layer 34 is coupled to the bus interface 28 to provide control functions for network devices (not shown) connected to the network port 26. The MAC layer 32 and physical layer 34 of the multi-port communications chip 20 are preferably used in conjunction with devices that supply the remainder of Ethernet controller functionality. The high speed Ethernet controller may have an operating speed of 1 Giga Bit or higher.

A serial ATA host adapter 36 may be coupled between the bus interface 30 and the serial ATA port 24. The serial ATA host adapter 36 connects the core chipset 22 and processor to a storage device 38 that may include a drive controller (not shown). The serial ATA host adapter 36 provides scalable performance starting at 1.5 gigabits per second, and software compatibility with conventional operating systems. Alternatively, the serial ATA host adapter 36 may couple to the core chipset 22 through another bus interface (not shown) and high speed bus. The storage device 38 includes devices such as hard drives, CD-ROM drives, DVD drives, CD-R/W drives, diskette drives, and tape storage drives.

Conventional systems typically include a parallel ATA host adapter within the core chipset. In addition, the trend in conventional systems is to integrate an increasing number of functions into fewer semiconductor devices such as the core chipset 22. The present invention recognizes the advantages of not including the serial ATA host adapter 36 in the core chipset 22, but instead including the serial ATA host adapter 36 in the multi-port communications chip 20. Serial ATA operates at a significantly higher data rate than parallel ATA, making the serial ATA host adapter more suitable for fabrication with mixed-signal CMOS processes than fabrication processes typically employed for the core chipset 22. Including the serial ATA host adapter 36 in the core chipset 22 would potentially increase costs due to more complex fabrication methods and possibly lower yields. Instead, the Serial ATA host adaptor 36 is fabricated in a semiconductor device outside of the core chipset 22, which may result in faster time-to-market, improved yield, and lower cost. In addition, the serial ATA host adaptor 36 is combined with the high speed Ethernet controller 33, a function having similar fabrication requirements, into a single semiconductor device. Combining the serial ATA host adapter 36 and the Ethernet controller 33 into a single semiconductor device may decrease cost by combining functions that have similar fabrication requirements, reduce the required board area, and minimize chip count. Also, in a preferred embodiment, recognizing that a single high speed bus 30 can support both the serial ATA host adaptor 36 and the high speed Ethernet controller 33 through a single bus interface 28, leads to the elimination of a separate bus interface and bus for each function. Older technology buses such as PCI (Peripheral Component Interface) do not have sufficient bandwidth on a single bus to adequately support both a storage device and network controller with present day multimedia requirements. Using a single bus interface 28 to interface both the serial ATA host adaptor 36 and the high speed Ethernet controller 33 to the high speed bus 30 further reduces complexity which may lead to further cost reduction, improved yield, and reduction in required board area.

Figure 3:
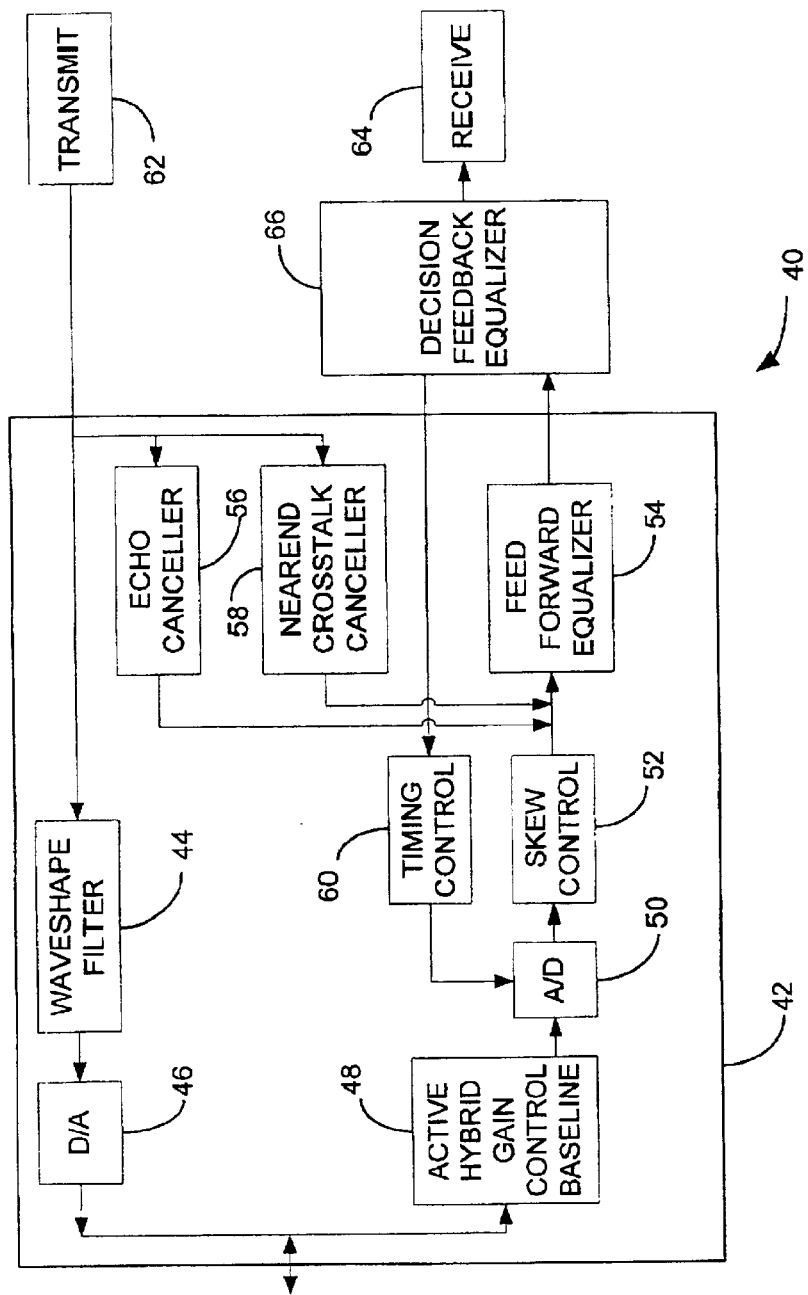
FIG. 3 is a block diagram of a high speed Ethernet controller.

FIG. 3 shows one embodiment of a high speed Ethernet physical layer device 40. The physical layer device 40 includes four channels 42 each operating at 250 MBits per second. Each of the channels 42 include in the transmit path a waveshape filter 44 coupled to a digital-to-analog converter 46. The receive path includes an active hybrid gain control baseline 48, analog-to-digital converter (A/D) 50, skew control 52, and feed forward equalizer 54 connected in series. An echo canceller 56 and crosstalk canceller 58 are coupled from the transmit path to the receive path. A timing control circuit 60 controls the timing of the A/D 50. A transmit circuit 62, receive circuit 64, and decision feedback equalizer 66 communicate with each of the channels 42.

A number of embodiments of the invention have been described. Nevertheless, it will be understood that various modifications may be made without departing from the spirit and scope of the invention. Accordingly, other embodiments are within the scope of the following claims.

What is claimed is:

1. An integrated circuit comprising:
a high speed bus interface to interface to a core chipset through a high speed bus;
a serial mass data storage host adapter in communication with the high speed bus interface to control a high speed mass data storage unit;
wherein the serial mass data storage host adapter controls the high speed mass data storage unit in response to a signal from the core chipset; and
a network controller in communication with the high speed bus interface to control a network port.

2. The integrated circuit of claim 1 wherein the serial mass data storage host adapter is a serial ATA host adapter.

3. The integrated circuit of claim 1 wherein the integrated circuit is a CMOS semiconductor.

4. An integrated circuit comprising:
a high speed bus interface to interface to a core chipset through a high speed bus;
a serial mass data storage host adapter in communication with the high speed bus interface to control a high speed mass data storage unit; and
a network controller in communication with the high speed bus interface to control a network port;
wherein the network controller includes an Ethernet controller having an operating speed of at least 1 Giga Bit per second.

5. The integrated circuit of claim 4 wherein the Ethernet controller includes a MAC layer and a physical layer.

6. The integrated circuit of claim 4, wherein the serial mass data storage host adapter comprises a serial ATA host adapter.

7. The integrated circuit of claim 4, wherein the integrated circuit comprises a CMOS semiconductor.

8. An integrated circuit comprising:
a high speed bus interface to interface to a core chipset through a high speed bus;
wherein the high speed bus interface is selected from the group comprising at least one of a PCI-X bus interface, a HyperTransport bus interface, a 3GIO bus interface, and an Infiniband bus interfaces;
a serial mass data storage host adapter in communication with the high speed bus interface to control a high speed mass data storage unit; and
a network controller in communication with the high speed bus interface to control a network port.

9. The integrated circuit of claim 8, wherein the serial mass data storage host adapter comprises a serial ATA host adapter.

10. The integrated circuit of claim 8, wherein the integrated circuit comprises a CMOS semiconductor.

11. An integrated circuit to communicate information with a core chipset over a high speed bus, comprising:
means for bus interfacing to the core chipset through the high speed bus;
means for controlling a high speed mass data storage unit, the controlling means in communication with the bus interfacing means and the high speed mass data storage unit;
wherein the controlling means controls the high speed mass data storage unit in response to a signal from the core chipset; and
means for network interfacing to a network port, the network interfacing means in communication with the bus interfacing means and the network port.

12. The integrated circuit of claim 11 wherein the controlling means is a serial ATA host adapter.

13. The integrated circuit of claim 11 wherein the integrated circuit is a CMOS semiconductor.

14. An integrated circuit to communicate information with a core chipset over a high speed bus, comprising:
means for bus interfacing to the core chipset through the high speed bus;
means for controlling a high speed mass data storage unit, the controlling means in communication with the bus interfacing means and the high speed mass data storage unit; and
means for network interfacing to a network port, the network interfacing means in communication with the bus interfacing means and the network port;
wherein the means for network controlling interfacing includes a high speed Ethernet controller having an operating speed of at least 1 Giga Bit per second.

15. The integrated circuit of claim 14 wherein the high speed Ethernet controller includes a MAC layer and a physical layer.

16. The integrated circuit of claim 14, wherein the controlling means comprises a serial ATA host adapter.

17. The integrated circuit of claim 14, wherein the integrated circuit comprises a CMOS semiconductor.

18. An integrated circuit to communicate information with a core chipset over a high speed bus, comprising:
means for bus interfacing to the core chipset through the high speed bus;
wherein the bus interfacing means is selected from the group comprising at least one of a PCI-X bus interface, a HyperTransport bus interface, a 3GIO bus interface, and an Infiniband bus interface;
means for controlling a high speed mass data storage unit, the controlling means in communication with the bus interfacing means and the high speed mass data storage unit; and
means for network interfacing to a network port, the network interfacing means in communication with the bus interfacing means and the network port.

19. The integrated circuit of claim 18, wherein the controlling means comprises a serial ATA host adapter.

20. The integrated circuit of claim 18, wherein the integrated circuit comprises a CMOS semiconductor.

21. A method of communicating information with a data storage unit and a network port, comprising:
providing, in a semiconductor circuit, a high speed bus interface to interface to a core chipset through a high speed bus;
providing a serial ATA host adapter in communication with the high speed bus interface to control the data storage unit in response to a signal from the core chipset;
wherein the serial ATA host adapter controls the data storage unit in response to a signal from the core chipset; and
providing a high speed Ethernet network controller in communication with the high speed bus interface to control the network port.

22. A method of communicating information with a data storage unit and a network port, comprising:
providing in a semiconductor circuit, a high speed bus interface to interface to a core chipset through a high speed bus;
providing a serial ATA host adapter in communication with the high speed bus interface to control the data storage unit in response to a signal from the core chipset; and
providing a high speed Ethernet network controller in communication with the high speed bus interface to control the network port;
wherein the high speed Ethernet network controller has an operating speed of at least 1 Giga Bit per second.

23. A method of communicating information with a data storage unit and a network port, comprising:
providing, in a semiconductor circuit, a high speed bus interface to interface to a core chipset through a high speed bus;
providing a serial ATA host adapter in communication with the high speed bus interface to control the data storage unit in response to a signal from the core chipset; and
providing a high speed Ethernet network controller in communication with the high speed bus interface to control the network port;
wherein the high speed Ethernet network controller includes a MAC layer and a physical layer.

24. A method of communicating information with a data storage unit and a network port, comprising:
providing in a semiconductor circuit, a high speed bus interface to interface to a core chipset through a high speed bus;
wherein the high speed bus interface is selected from the group comprising at least one of a PCI-X bus interface, a HyperTransport bus interface, a 3GIO bus interface and an Infiniband bus interfaces;
providing a serial ATA host adapter in communication with the high speed bus interface to control the data storage unit in response to a signal from the core chipset; and
providing a high speed Ethernet network controller in communication with the high speed bus interface to control the network port.

25. An integrated circuit to communicate information between a core chipset and a network port and a data storage unit over a high speed bus, comprising:
a high speed bus interface to interface to the core chipset through the high speed bus;
wherein the high speed bus interface is selected from the group comprising at least one of a PCI-X bus interface, a HyperTransport bus interface, a 3GIO bus interface and an Infiniband bus interfaces;
a serial ATA host adapter in communication with the high speed bus interface to control the data storage unit in response to a signal from the core chipset; and
a high speed Ethernet network controller in communication with the high speed bus interface to control the network port.

26. An integrated circuit to communicate information between a core chipset and a network port and a data storage unit over a high speed bus, comprising:
a high speed bus interface to interface to the core chipset through the high speed bus;
a serial ATA host adapter in communication with the high speed bus interface to control the data storage unit in response to a signal from the core chipset; and
a high seed Ethernet network controller in communication with the high speed bus interface to control the network port;
wherein the high speed Ethernet network controller has an operating speed of at least 1 Giga Bit per second.

27. The integrated circuit of claim 26 wherein the high speed Ethernet network controller includes a MAC layer and a physical layer.

28. An integrated circuit to communicate information between a core chipset and a network port and a data storage unit over a high speed bus, comprising:
means for bus interfacing to the core chipset through the high speed bus;
means for controlling the data storage unit, the controlling means to provide communication between the bus interfacing means and the data storage unit in response to a signal from the core chipset; and
means for network interfacing to a network port, the network interfacing means in communication with the bus interfacing means and the network port.

29. The integrated circuit of claim 28 wherein the means for bus interfacing is selected from the group comprising at least one of a PCI-X bus interface, a HyperTransport bus interface, a 3GIO bus interface, and an Infiniband bus interface.

30. The integrated circuit of claim 28 wherein the network interfacing means includes an Ethernet controller having an operating speed of at least 1 Giga Bit per second.

31. The integrated circuit of claim 30 wherein the Ethernet controller includes a MAC layer and a physical layer.

32. A multi-port integrated circuit to communicate information between a core chipset and at least two peripheral devices over a high speed bus, the two peripheral devices including a data storage unit and a network device, comprising:

a high speed bus interface to interface to the core chipset through the high speed bus;

a serial ATA host adapter in communication with the high speed bus interface and a first port to control the data storage unit in response to a signal from the core chipset; and a high speed Ethernet network controller in communication with the high speed bus interface and a second port to control the network device.

33. The integrated circuit of claim 32 wherein the high speed Ethernet network controller includes an Ethernet controller having an operating speed of at least 1 Giga Bit per second.

34. The integrated circuit of claim 33 wherein the Ethernet controller includes a MAC layer and a physical layer.

35. The integrated circuit of claim 32 wherein the high speed bus interface is selected from the group comprising at least one of a PCI-X bus interface, a HyperTransport bus interface, a 3GIO bus interface, and an Infiniband bus interface.

36. A multi-port integrated circuit to communicate information between a core chipset and at least two peripheral devices over a high speed bus, the two peripheral devices including a data storage unit and a network device, comprising:

means for bus interfacing to the core chipset through the high speed bus;

means for controlling the data storage unit in serial communication with the high speed bus interface and a first port to control the data storage unit in response to a signal from the core chipset; and means for network interfacing to a second port, the network interfacing means in communication with the high speed bus interface and the second port to control the network device.

37. The integrated circuit of claim 36 wherein the network interfacing means includes an Ethernet controller having an operating speed of at least 1 Giga Bit per second.

38. The integrated circuit of claim 37 wherein the Ethernet controller includes a MAC layer and a physical layer.

39. The integrated circuit of claim 36 wherein the bus interfacing means is selected from the group comprising at least one of a PCI-X bus interface, a HyperTransport bus interface, a 3GIO bus interface, and an Infiniband bus interface.

* * * * *